J. McMAHEL.
Animal Trap.
No. 201,546. Patented March 19, 1878.
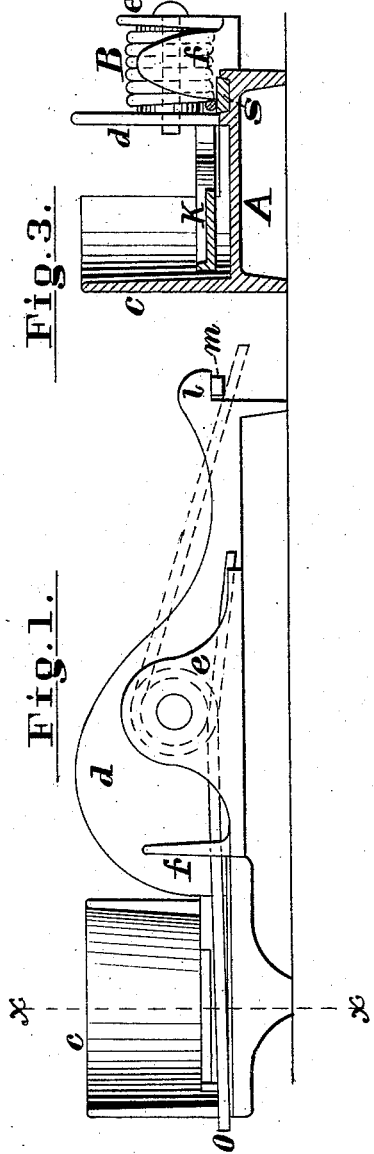
Witnesses
Geo. T. Reiss
Chas A Johnson
John McMahel Inventor
By
Peck & Hosea Attorneys

UNITED STATES PATENT OFFICE.

JOHN McMAHEL, OF CINCINNATI, OHIO.

IMPROVEMENT IN ANIMAL-TRAPS.

Specification forming part of Letters Patent No. 201,546, dated March 19, 1878; application filed January 11, 1878.

*To all whom it may concern:*

Be it known that I, JOHN MCMAHEL, of Cincinnati, Ohio, have invented a new and useful Improvement in Animal-Traps, of which the following is a full and exact description, reference being had to the accompanying drawings, and to the letters of reference marked thereon.

Figure 1 is a front elevation of my improved trap. Fig. 2 is a top or plan view of the same. Fig. 3 is a transverse section of the same, taken at line $x\ x$ of Fig. 1.

My invention relates to that class of traps which kill the animal by striking it while attempting to take the bait; and consists in the combination of a spiral spring terminating as a striker, with a pivoted trigger-lever, and a frame having guards and guides, as hereinafter set forth.

The base or frame plate A is cast with vertical flanges $c\ d\ e$ and a vertical tongue or guide, $f$, for the striker, as represented in the drawings, and between the flanges or guards $e\ d$ the spiral wire spring B is coiled around a roll, through which and through the flanges $e\ d$ a bolt or pin passes, and retains the spring in place.

One end of spring B rests against the frame at $g$, and its other end, constituting the striker, projects sufficiently to reach either end of the frame A, at the middle of which its coil is located.

The trigger-lever C is vertically pivoted at $i$ upon the base-plate, and terminates with a bait-pan, K, at that end farthest from its fulcrum-pin $i$, and is provided with a lateral tooth, $m$, at the other end, as shown in Fig. 2.

The flange or guard $d$ has a projecting lip, $l$, under which the tooth $m$ of the trigger works, and serves to prevent the spring B from producing torsional strain upon the trigger-lever pivot $i$ when the trap is set.

The curved flange or hood $c$ is of sufficient height to protect a bait secured upon pan K from being reached from the rear side of the trap; and the flange $d$ and vertical tongue $f$ serve as guides to direct and govern the motion of the striker $o$, which acts as a whip at the end of spring B.

The plate A may be made as a skeleton frame, and have a suitable opening below the pan to give free access to it for securing the bait upon its upper side.

That portion of the plate A in front of the pan K and flange $c$ has a recess, P, as represented in Figs. 2 and 3, to serve as a bed for a leather cushion, S, to receive the striker O when the trap is sprung.

The trap is set by forcing the striker O back beneath the tooth $m$ of the trigger, which holds it delicately under its smooth inclined surface, and when the animal attempts to remove the bait from the pan K, causing a slight forward movement of the pan, the striker will be released by withdrawing the tooth $m$ of the trigger, when the action of the spring B will cause a severe blow to be given by the striker upon the head or neck of the animal, which will necessarily be over recess P when attempting to withdraw the bait.

The fulcrum-pin $i$, on which trigger-lever C works, being located near its toothed end, enables the slightest forward motion of the pan K and its lever to spring the trap.

It is apparent that a strong bolt will hold spring B in place without the aid of the front ledge or flange of frame A, and the hood $c$ may be continued around to meet flange $d$, leaving a slot beneath it for the trigger-lever to work in; and it is also obvious that the trigger-lever may be made to work below the frame-plate A, these being simple modifications of my invention.

Having fully described my invention, I claim and desire to secure by Letters Patent—

The trigger-lever C, provided with pan K and lateral tooth $m$, in combination with spring B, having striker O, and the frame A, provided with guard-flanges and guide $f$, substantially as and for the purpose described.

Witness my hand this 3d day of January, A. D. 1878.

JOHN McMAHEL.

Attest:
L. M. HOSEA,
H. P. K. PECK.